United States Patent
Viaud et al.

(10) Patent No.: US 8,145,198 B2
(45) Date of Patent: Mar. 27, 2012

(54) METHOD OF INITIALIZING AN ELECTRONIC RADIO COMMUNICATION MODULE, METHOD OF COMPRESSING AND DECOMPRESSING CALIBRATION PARAMETERS, CORRESPONDING COMPUTER PROGRAMME PRODUCT AND STORAGE MEANS

(75) Inventors: Sylvain Viaud, Issy les Moulineaux (FR); Laurent Girault, Issy les Moulineaux (FR)

(73) Assignee: Wavecom, Issy-les-Moulineaux Cedex (FR)

( * ) Notice: Subject to any disclaimer, the term of this patent is extended or adjusted under 35 U.S.C. 154(b) by 601 days.

(21) Appl. No.: 12/296,231

(22) PCT Filed: Jan. 29, 2007

(86) PCT No.: PCT/EP2007/050854
§ 371 (c)(1),
(2), (4) Date: Jun. 1, 2009

(87) PCT Pub. No.: WO2007/113026
PCT Pub. Date: Oct. 11, 2007

(65) Prior Publication Data
US 2009/0286493 A1 Nov. 19, 2009

(30) Foreign Application Priority Data
Apr. 6, 2006 (FR) ...................... 06 03064

(51) Int. Cl.
*H04M 3/00* (2006.01)
(52) U.S. Cl. .................. 455/418; 455/412.1; 455/67.11; 455/72; 348/568; 348/E7.029; 348/E7.032; 370/252

(58) Field of Classification Search .................. 455/418, 455/412.1, 186.1, 514, 90.2, 95, 67.11, 72; 348/14.13, 568, E7.029, E7.032; 370/252; 250/238
See application file for complete search history.

(56) References Cited

U.S. PATENT DOCUMENTS

| | | | |
|---|---|---|---|
| 4,746,879 A | 5/1988 | Ma et al. | |
| 6,552,332 B2 * | 4/2003 | Kusaka et al. | 250/238 |
| 8,001,277 B2 * | 8/2011 | Mega et al. | 709/247 |
| 2001/0007348 A1 * | 7/2001 | Kusaka et al. | 250/238 |
| 2004/0113052 A1 * | 6/2004 | Johanneson et al. | 250/214 R |
| 2005/0221764 A1 | 10/2005 | Shen et al. | |
| 2007/0104113 A1 * | 5/2007 | Mega et al. | 370/252 |
| 2007/0104118 A1 * | 5/2007 | Mega et al. | 370/254 |

FOREIGN PATENT DOCUMENTS
WO 0184741 A2 11/2001

* cited by examiner

*Primary Examiner* — Shaima Q Aminzay
(74) *Attorney, Agent, or Firm* — David D. Brush; Westman, Champlin & Kelly, P.A.

(57) ABSTRACT

The invention relates to a method of initializing an electronic radio communication module making it possible to execute a radio communication program, stored in a first non-volatile memory, the initialization being based on values of calibration parameters. According to the invention, the method comprises the following steps, performed by the module when it executes the program: reading (E11) of at least one compressed calibration parameter in a second non-volatile memory; decompressing (E12) each compressed calibration parameter read, so as to obtain a decompressed calibration parameter; and initializing (E14) the module, based on the values of the decompressed calibration parameters.

12 Claims, 7 Drawing Sheets

TAB 1

| | RF Parameters | Initial value | Compression parameters | | Finale size (bits) | Initial range | Compressed value |
|---|---|---|---|---|---|---|---|
| | | | Offset | Granularity | | | |
| Rx | BoardGain_GSM900 | 93 | 88 | 1 | 4 | 88-103 | 5 |
| | BoardGain_DCS1800 | 93 | 88 | 1 | 4 | 88-103 | 5 |
| | BoardGain_PCS1900 | 93 | 88 | 1 | 4 | 88-103 | 5 |
| | BoardGain_GSM850 | 95 | 88 | 1 | 4 | 88-103 | 7 |
| AFC | RoughDacValue | 59 | 26 | 1 | 6 | 26-88 | 33 |
| Tx | N_PCLmax_GSM900 | 909 | 650 | 10 | 5 | 650-960 | 25 |
| | N_PCLmax_DCS1800 | 888 | 650 | 10 | 5 | 650-960 | 23 |
| | N_PCLmax_PCS1900 | 910 | 650 | 10 | 5 | 650-960 | 26 |
| | N_PCLmax_GSM850 | 901 | 650 | 10 | 5 | 650-960 | 25 |
| | Poff_GSM900 | 32 | 27.3 | 0.2 | 5 | 27.3-33.5 | 23 |
| | M_GSM900 | 35 | 31.5 | 1 | 3 | 31.5-38.5 | 3 |
| | Nmin_GSM900 | 77 | 30 | 3 | 5 | 30-123 | 15 |
| | Poff_DCS1800 | 28.11 | 24.6 | 0.2 | 5 | 24.6-30.8 | 17 |
| | M_DCS1800 | 32.01 | 28.5 | 1 | 3 | 28.5-35.5 | 3 |
| | Nmin_DCS1800 | 68 | 19 | 3 | 5 | 19-112 | 16 |
| | Poff_PCS1900 | 28.04 | 23.5 | 0.2 | 5 | 23.5-29.7 | 22 |
| | M_PCS1900 | 33.74 | 30 | 1 | 3 | 30-37 | 3 |
| | Nmin_PCS1900 | 58 | 10 | 3 | 5 | 10-103 | 16 |
| | Poff_GSM850 | 31.7 | 27.5 | 0.2 | 5 | 27.5-33.7 | 20 |
| | M_GSM850 | 33.9 | 29 | 1 | 3 | 29-36 | 4 |
| | Nmin_GSM850 | 84 | 43 | 3 | 5 | 43-136 | 13 |
| | | | | Total | 94 | | |

C81  C82  C83  C84  C85  C86  C87  C88

Compressed Result on 94 bits

0101010101010101111000011100110111111101011001101110101101111110001011100001011001110000101001000111101

SEQ 1

Fig. 8

SEQ 1

0101010101010111100001110011011111101011001101110110111110001011100001011001110000101001001101

| | RF Parameters | Compressed value | Compression parameters | | Deompressed value |
|---|---|---|---|---|---|
| | | | Offset | Granularity | |
| Rx | BoardGain_GSM900 | 5 | 88 | 1 | 93 |
| | BoardGain_DCS1800 | 5 | 88 | 1 | 93 |
| | BoardGain_PCS1900 | 5 | 88 | 1 | 93 |
| | BoardGain_GSM850 | 7 | 88 | 1 | 95 |
| AFC | RoughDacValue | 33 | 26 | 1 | 59 |
| Tx | N_PCLmax_GSM900 | 25 | 650 | 10 | 900 |
| | N_PCLmax_DCS1800 | 23 | 650 | 10 | 880 |
| | N_PCLmax_PCS1900 | 26 | 650 | 10 | 910 |
| | N_PCLmax_GSM850 | 25 | 650 | 10 | 900 |
| | Poff_GSM900 | 23 | 27.3 | 0.2 | 31.9 |
| | M_GSM900 | 3 | 31.5 | 1 | 34.5 |
| | Nmin_GSM900 | 15 | 30 | 3 | 75 |
| | Poff_DCS1800 | 17 | 24.6 | 0.2 | 28 |
| | M_DCS1800 | 3 | 28.5 | 1 | 31.5 |
| | Nmin_DCS1800 | 16 | 19 | 3 | 67 |
| | Poff_PCS1900 | 22 | 23.5 | 0.2 | 27.9 |
| | M_PCS1900 | 3 | 30 | 1 | 33 |
| | Nmin_PCS1900 | 16 | 10 | 3 | 58 |
| | Poff_GSM850 | 20 | 27.5 | 0.2 | 31.5 |
| | M_GSM850 | 4 | 29 | 1 | 33 |

C91  C92  C93  C94  C95  C96

TAB 2

Fig. 9

METHOD OF INITIALIZING AN ELECTRONIC RADIO COMMUNICATION MODULE, METHOD OF COMPRESSING AND DECOMPRESSING CALIBRATION PARAMETERS, CORRESPONDING COMPUTER PROGRAMME PRODUCT AND STORAGE MEANS

CROSS-REFERENCE TO RELATED APPLICATIONS

This Application is a Section 371 National Stage Application of International Application No. PCT/EP2007/050854, filed Jan. 29, 2007 and published as WO 2007/113026 on Oct. 11, 2008, not in English.

STATEMENT REGARDING FEDERALLY SPONSORED RESEARCH OR DEVELOPMENT

None.

THE NAMES OF PARTIES TO A JOINT RESEARCH AGREEMENT

None.

FIELD OF THE DISCLOSURE

The field of the disclosure is that of radio communications, and more precisely of digital radio communication terminals, whether entailing radio telephones or devices or means of all types able to exchange signals using a radio communication system, implanted for example in machines or vehicles.

The disclosure relates more particularly to the initializing of an electronic radio communication module.

BACKGROUND OF THE DISCLOSURE

1. Radio Communication Module

Currently, much research is being devoted to the manufacture of radio communication devices. Indeed, the aim concerns at least three objectives that are difficult to reconcile: miniaturizing the devices, increasing and adapting the functionalities, and simplifying assembly.

In order to guarantee optimal integration the holder of this application has proposed an approach consisting in grouping together in a single module (called an electronic radio communication module), all or at least most of the functions of a digital radio communication device.

Such a module is presented in the form of a single housing, preferentially shielded, that the device manufacturers can implant directly, without having to take a multitude of components into account.

This module (still sometimes referred to as "macro component") is indeed formed of a grouping of several components on a substrate, in such a way as to be embedded in the form of a single element. It includes the components (in particular a processor and memories (a volatile memory and a non-volatile memory) and the essential software needed for the operation of a radio communication device (also referred to as radio communication terminal or wireless terminal) using radio frequencies.

Such a module thus makes it possible to integrate all of the components into wireless terminals (portable telephones, modems, or any other device making use of a wireless standard) easily, rapidly and in an optimized manner.

As such, the modules distributed by the holder of this application are fully tested from a hardware as well as a software standpoint on most of the networks on which they can then be used. Furthermore, the module advantageously encompasses the aspects of intellectual property (or IPRs, for "Intellectual Property Rights") (all of the functions have been grouped together, it is the manufacturer of the module who handles aspects concerning the corresponding industrial property rights) and technical assistance.

2. Disadvantages of Prior Art

Generally, electronic radio communication modules are initialized with calibration parameters, before use.

This is in particular due to the fact that they carry a hardware portion that calls upon analogue electronics. Indeed, the high dispersion of the electrical parameters of this hardware portion require software compensations via the use of parameters of which the value is set at the end of a calibration process, during production (in factory) of the radio communication module.

However, this known calibration technique has the disadvantage of requiring a high-capacity non-volatile memory (for example of the "flash" type), and therefore costly and cumbersome, to store the aforementioned compensating parameters. Indeed, the memory space used by the calibration parameters of the hardware portion of the radio communication module is not negligible (approximately 8 Kbits are needed in prior art).

The constraints of integrating these radio communication modules increase on a regular basis. There is therefore a need to optimize the storage of the calibration parameters of the hardware portion of the radio communication module, in particular for the implementation of a radio communication module that does not have a high-capacity non-volatile memory.

SUMMARY

An aspect of the disclosure relates to a method of initializing an electronic radio communication module capable of executing at least one radio communication program, stored in a first non-volatile memory, said initialization being based on calibration parameter values.

According to an embodiment of the invention, the method comprises the following steps, carried out by said module when it executes said at least one program:

reading of at least one compressed calibration parameter in a second non-volatile memory;

decompressing each compressed calibration parameter read, in order to obtain a decompressed calibration parameter; and initializing of said module based on the values of said decompressed calibration parameters.

As such, an embodiment of the invention is based on an entirely new and inventive approach for the initialization of a radio communication module. Indeed, this initialization of the module is carried out using the decompressing of compressed calibration parameters and stored in a non-volatile memory of reduced size. The radio communication module is thus released from the use of a cumbersome and costly non-volatile memory. The second non-volatile memory is for example a memory of the fusible type, originally intended to receive serial numbers.

Note that this embodiment of the invention covers the case wherein the first and second non-volatile memories are built into the radio communication module, as well as the case wherein one of the two non-volatile memories or none is present in the module.

In a particular embodiment, the first non-volatile memory (external or internal to the module) furthermore stores a decompressing program, making it possible when it is executed by the module (by the hardware means of execution) to obtain decompressed calibration parameters using the compressed calibration parameters.

Advantageously, the first non-volatile memory is external to said module.

Advantageously, the module executes a step of storing said decompressed calibration parameters in a third volatile memory.

The decompressed calibration parameters are for example stored in a third external volatile memory, for example, a PSRAM memory.

Advantageously, the third volatile memory is external to said module.

Preferentially, the module executes said step of reading, by reading said compressed calibration parameters in a non-volatile memory internal to said module and forming said second memory.

Advantageously, the calibration parameters include at least one parameter relating to a power amplifier included in said module, and belonging to the group comprising:
reception parameters;
transmission parameters;
frequency parameters.

An embodiment of the invention also relates to a method of compressing at least one calibration parameter of an electronic radio communication module capable of executing at least one radio communication program stored in a first non-volatile memory, said module being initialized with a value of each calibration parameter, said value of each calibration parameter being included in an initial range of possible values, said initial range being centered on an average value and function of the dispersion of said module.

According to an embodiment of the invention, the method comprises the following steps, for at least one calibration parameter:
obtaining, for said parameter, of a range of useful values, of a size that is less than said initial range, the limits of the range of useful values are chosen in such a way as to include all of the values of said parameter that it is actually possible to encounter in production;
obtaining, for said parameter, of a maximum error value on said parameter so as to maintain an operation of the radio communication module that complies with predetermined specifications;
obtaining of a discrete value of said parameter within said range of useful values;
compressing of said discrete value according to said discrete value, said range of useful values of said parameter and said maximum error value so as to obtain a compressed value.

Note that the method of compressing according to an embodiment of the invention is based on a discretization of ranges of potential values (or typical values observed in production) for each calibration parameter. As such, it is possible to accurately define the number of bits needed to store each parameter to be calibrated as a digital (parameter relating to logical functions), analogue (parameter relating to functions of the audio type) and radio frequency (parameter relating to the transmission and reception of a radio signal) functions.

For a given parameter, the limits of the range of useful values are chosen in such a way as to include all of the values of the given parameter that it is actually possible to encounter in production.

In a preferred embodiment of the invention, the method comprises a prior step of selecting at least one calibration parameter, according to at least one dispersion criterion.

According to an advantageous aspect of an embodiment of the invention, said step of compression implements a compression such that, for a given calibration parameter, the compressed value of said given parameter is defined by:

Compressed value=$E$((Initial value−Offset)/Granularity)

where
"Compressed value" designates the compressed value of said given parameter;
"Initial value" designates the discrete value of said given parameter;
"Offset" corresponds to an offset value defined according to the typical value and the range of dispersion known in production;
"Granularity" corresponds to the size of the smallest interval between two values obtained after decompression; and
"E" designates the notation of the integer function.

The granularity value, also called "step", is chosen according to the precision needed on the initial value. For this, the influence of the imprecision of the initial value on the overall performance of the electronic radio communication module must be analysed beforehand.

An embodiment of the invention also relates to a method of decompressing at least one calibration parameter of an electronic radio communication module capable of executing at least one radio communication program stored in a first non-volatile memory, said module being initialized with a value of each calibration parameter, said value of each calibration parameter being comprised in an initial range of possible values, said initial range being centered on an average value and function of the dispersion of said module.

According to an embodiment of the invention, the method comprises the following steps, for at least one compressed calibration parameter:
obtaining of an offset value defined beforehand, during the compression of said parameter, according to a range of useful values, of a size that is less than said initial range, and of an average value of said parameter;
obtaining of a granularity value, defined beforehand during the compression of said parameter, according to a maximum error value on said parameter;
decompressing of the compressed value of said parameter according to said compressed value, said offset value and said granularity value, so as to obtain a decompressed value.

According to an advantageous aspect of an embodiment of the invention, said step of decompression implements a decompression such that, for a given calibration parameter, the decompressed value of said given parameter is defined by:

Decompressed value=Offset+(Granularity*compressed value)

where
"Decompressed value" designates the decompressed value of said given parameter;
"Compressed value" designates the compressed value of said given parameter;
"Offset" corresponds to an offset value defined according to the typical value and the range of dispersion known in production; and
"Granularity" corresponds to the size of the smallest interval between two values obtained after decompression.

An embodiment of the invention furthermore relates to a computer program product that can be downloaded from a communication network and/or recorded on a medium that can be read by computer and/or executed by a processor, comprising program code instructions for the execution of the steps of the aforementioned methods, when said program is executed on a computer.

An embodiment of the invention also relates to a storage means, that may be totally or partially removable, that can be read by a computer, storing a set of instructions that can be executed by said computer in order to implement the aforementioned methods.

BRIEF DESCRIPTION OF THE DRAWINGS

Other characteristics and advantages of embodiments of the invention shall appear during the reading of the following description of a particular embodiment of the invention, given by way of an informative and non-limiting example (all of the embodiments of the invention are not limited to the characteristics and advantages of this particular embodiment), and the annexed drawings, wherein.

DETAILED DESCRIPTION OF ILLUSTRATIVE EMBODIMENTS

1. Description of an Embodiment of the Method of Initializing a Radio Communication Module According to the Invention In relation with FIG. 1, a flow chart is shown showing a particular embodiment of the method of initializing a radio communication module according to the invention, in the case where the module is initialized with a plurality of calibration parameters.

Figure 1:
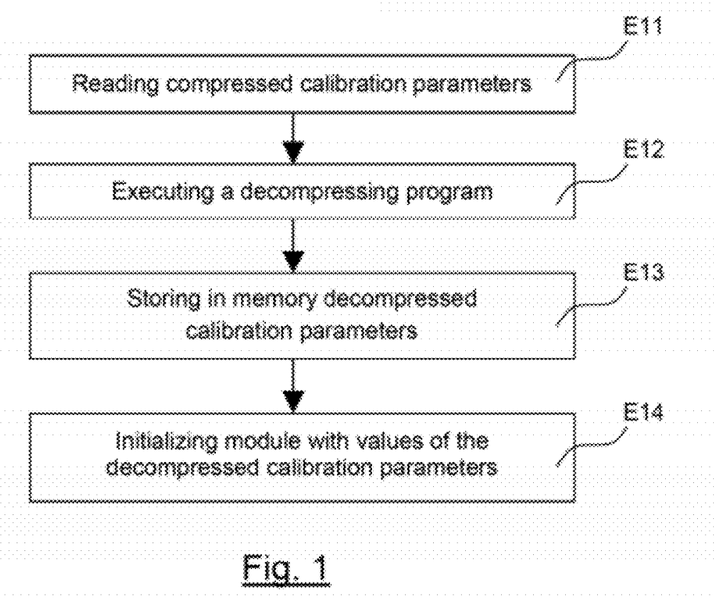
FIG. 1 shows a flow chart of a particular embodiment of a method of initializing a module.

It is supposed that, during the initialization, the module executes a radio communication program (also called functional software) stored in a first non-volatile external memory.

During a first step E11, the module reads compressed calibration parameters in a second non-volatile memory. In a particular embodiment, the second non-volatile memory is internal to the module.

During a step E12, the module executes a decompressing program (for example stored in the first non-volatile external memory) making it possible to decompress each compressed calibration parameter read in step E11.

Then, during a step E13, the module stores, for example, in a third external volatile memory the decompressed calibration parameters from step E12.

Finally, during a step E14, the module is initialized with the values of the decompressed calibration parameters obtained in step E12.

2. Description of an Embodiment of the Method of Compressing Calibration Parameters According to the Invention 2.1. Principle of Compression The method of compressing of an embodiment of the invention is based on the use of a mathematical model of the operation of a power amplifier built into a radio communication module on the one hand and on a discretization of ranges of potential values for each minimal calibration parameter on the other hand. The method of compressing of an embodiment of the invention makes it possible for example to obtain a set of reduced calibration parameters in a memory space less than 200 bits. As such, it is possible to carry out and to produce a radio communication module without internal volatile memory dedicated to storing calibration parameters.

2.2. Identification of the Minimal Calibration Parameters Needed for the Proper Operation of the Radio Communication Module All of the calibration parameters in current use are not necessary. It is necessary to store only the parameters (called minimal calibration parameters) of which the effects of the dispersion in production have an impact on the quality of the radio communication module.

Appendix 1 shows a list of minimal calibration parameters needed for the proper operation of the radio communication module and a calculation example of the minimal size of ROM (for "Read Only Memory") memory needed to store these minimal calibration parameters. This appendix is an integral part of this description.

As already indicated, the mathematical modelling of the operation of the power amplifier built into the radio communication module, makes it possible to substitute for the current storage of the setting to be programmed for each power level, the parameters of the equation making it possible to obtain this setting.

Figure 8:
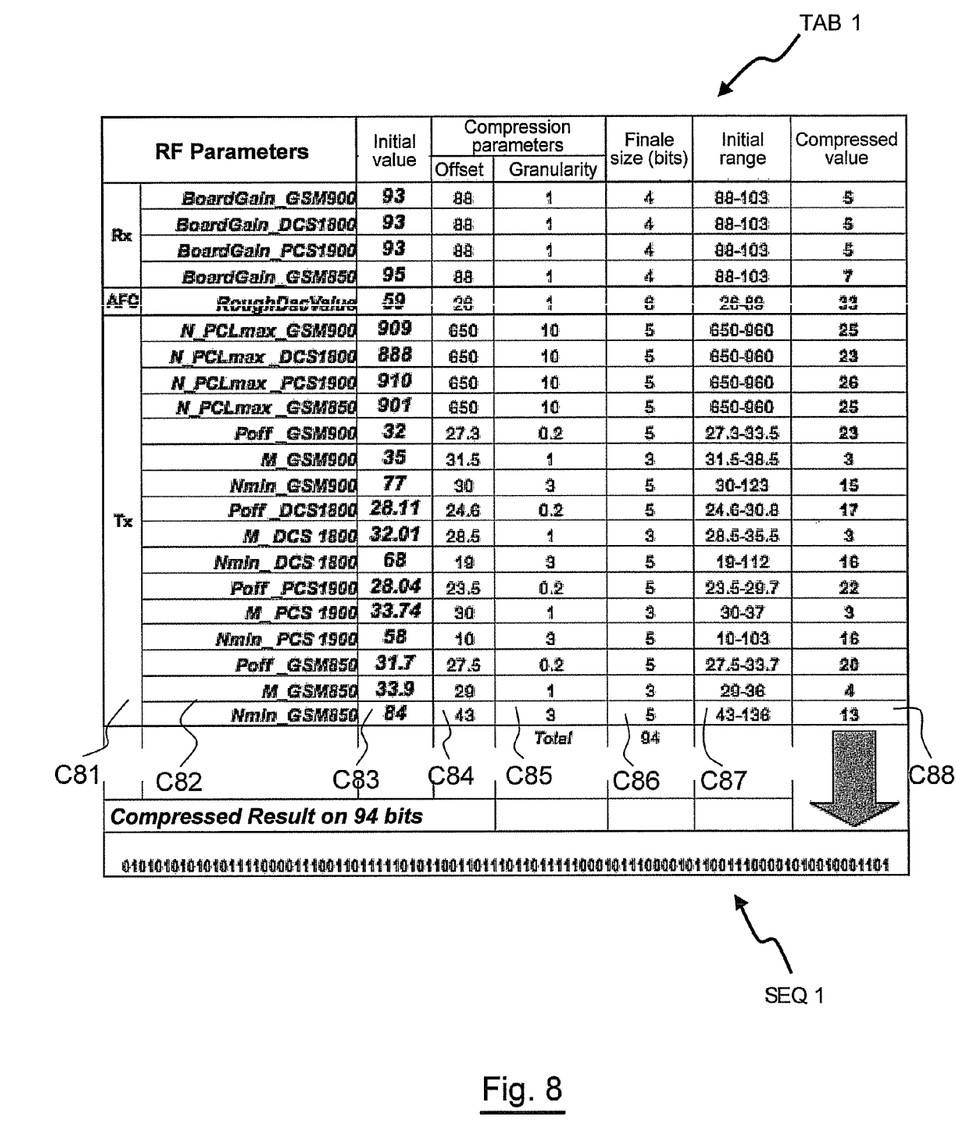
FIG. 8 shows a table showing compressed calibration parameters, for the particular case of a radio communication module of the GSM quad-band type.

In relation with FIG. 8, a table TAB 1 is shown showing the minimal calibration parameters, for the particular case of a radio communication module of the GSM quad-band type. The first column C81 of the table indicates the type of parameter (Rx, AFC and Tx). The second column C82 indicates the name of the calibration parameters (for example "Board-Gain_GSM900"). The third column C83 of the table indicates the initial value. The fourth C84 and fifth C85 columns of the table indicate the compression parameters, i.e. the offset (fourth column) and the granularity (fifth column). The sixth column C86 of the table indicates the size in bits ("final size") of the compressed calibration parameter. The seventh column C87 of the table indicates the input range (also called hereafter initial range). The eighth column C88 of the table indicates the compressed value of the calibration parameter.

Note that the offset corresponds to an offset defined according to the typical value and range of dispersion known in production.

Note also that the granularity is defined according to the sensitivity of the results of the output power on the calibration parameter.

In all the rest of this document, the following definitions shall be considered:

BoardGain corresponds to the gain, expressed in dB, of all of Radio-Frequency receiving channel;

RoughDACValue corresponds to the numerical value to be applied to the digital/analogue converter (DAC) carrying out the rough setting (Rough) of the reference frequency of the Radio-Frequency synthesizer;

N_PCLmax corresponds to the numerical value to be applied to the digital/analogue converter setting the desired voltage applied to the RF power amplifier when the latter provides the maximum power provided for by the standard;

Nmin, Poff and M are the modelling parameters for the RF power amplifier.

It is important to note that the 94-bit binary sequence SEQ1 (i.e. the compressed result) is comprised of all of the compressed values C88, coded in binary, then placed end to end.

In the first column C81 of the table TAB1, three types of parameters are distinguished (Rx, AFC and Tx):

the reception parameters: four values of reception channel gain are needed;

the frequency parameters: the only useful frequency parameter is the AFC (for "Automatic Frequency Control") parameter; and the transmission parameters: for each power output level of the product ("PCL" for "Power Control Level") and each frequency band there is a set of parameters. In order to reduce the size of the storage space, the modelling parameters of the power amplifier ("PA" for "Power Amplifier) are stored. Three parameters for each frequency band and one additional parameter are stored, corresponding to the smallest power control loop (max. power, saturation) for each frequency band.

A total of 21 radiofrequency calibration parameters are obtained for a size of approximately 300 bits.

2.3. Reducing the Initial Coding Range

Figure 4A:
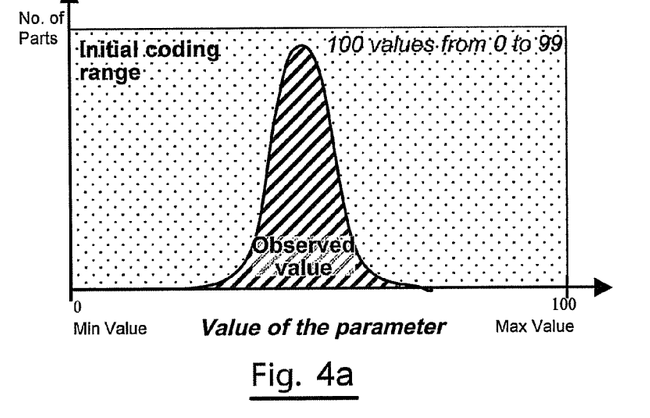
FIGS. 4a to 4c show the principle of discretizing the values of the calibration parameters, according to a particular embodiment of the invention.
Figure 4B:
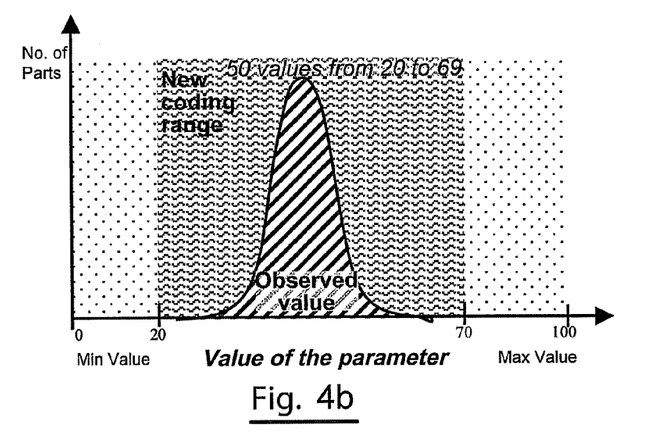

An embodiment of the invention is based on the following observation: As shown in FIG. 4a, the initial range of possible values of a given parameter is centered on an average value, this range being a function of the dispersion. As shown in FIG. 4b, the analysis of dispersion on each parameter stored in memory makes it possible to define a range of "useful" values, of a size that is less than the initial range. As such, it is possible to reduce the range used for the coding.

2.4. Discretization of the Values of the Parameters

Figure 4C:
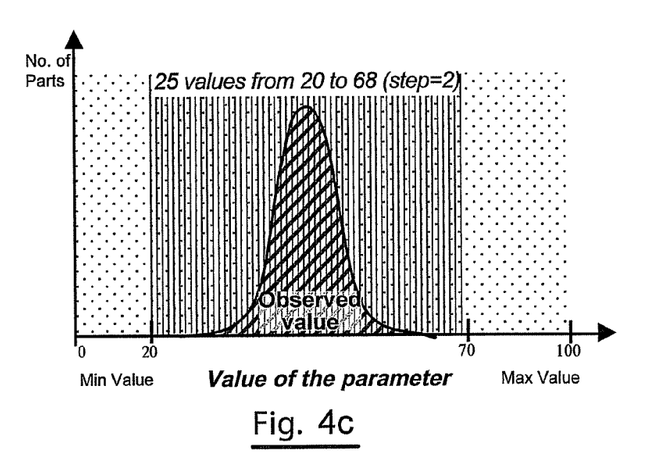

As shown in FIG. 4c, the operation of discretization consists in dividing the range of "useful" values into a finite set of discrete values, separated by a step of which the value must be defined specifically for each parameter to be stored.

The initial value of the parameter shall be rounded to the nearest discrete value.

2.5. Calibration Parameter Compression Formula

Each calibration parameter is compressed according to a compression formula defined by:

$$\text{Compressed value} = E((\text{Initial value} - \text{Offset})/\text{Granularity})$$

where

"Compressed value" designates the compressed value of the parameter;

"Initial value" designates the discrete value of the parameter to be compressed;

"Offset" corresponds to an offset value defined according to the typical value and the range of dispersion known in production;

"Granularity" corresponds to the size of the smallest interval between two values obtained after decompression (in other terms it corresponds to the step of discretization to be applied); and "E" designates the notation of the integer function.

In this embodiment (in reference to FIG. 8), the size of the storage space is reduced from 300 bits to only 94 bits.

Figure 2:
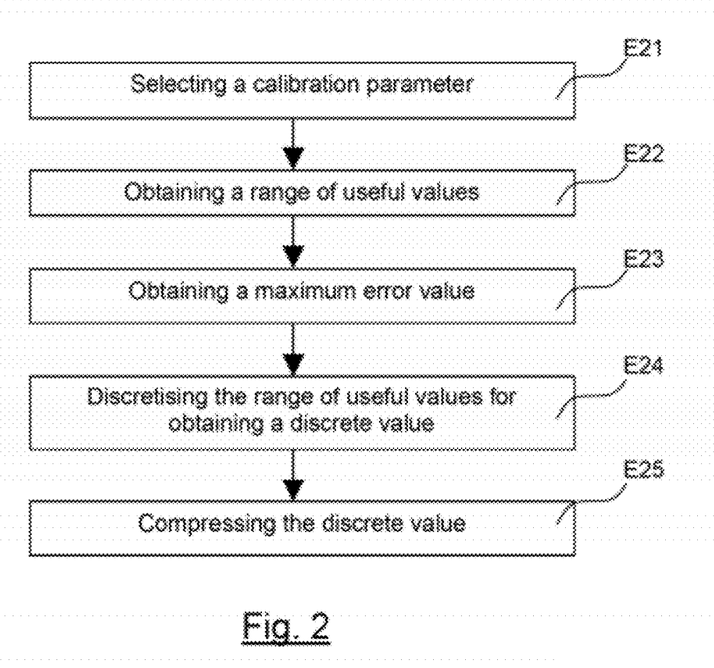
FIG. 2 shows a flow chart of a particular embodiment of a method of compressing a calibration parameter.

In relation with FIG. 2, a flow chart is shown showing a particular embodiment of the method of compressing calibration parameters according to the invention.

During a first step E21, a calibration parameter is selected, according to a dispersion criterion relative to the quality of the radio communication module. The radio communication module must be initialized with an initial value. Note that the selected parameter has a value which is comprised in an initial range of possible values. The initial range is centered on an average value and is in function of the dispersion of the module.

During a step E22, for the parameter selected in step E21, a range of useful values is obtained, of a size that is less than the initial range of values and an average value of the parameter.

During a step E23, for the parameter selected in step E21, a maximum error value on the parameter is obtained, in such a way as to maintain an operation of the radio communication module that complies with its specifications.

Then, during a step E24, the range of useful values obtained in step E22 is discretized, then a discrete value of the parameter selected in step E21 is obtained, by choosing the discrete value that is nearest to the initial value.

Finally, during a step E25, the discrete value obtained in step E24 is compressed according to the discrete value, the range of useful values (step E22), the average value of the parameter (step E22) and the maximum error value (step E23).

3. Description of an Embodiment of the Method of Decompressing Compressed Calibration Parameters According to the Invention 3.1. Principe of Decompression The use of a process for reducing the size results in an unavoidable operation of decompression. The latter is specific to the mode of compression used, and is carried out during the initialization of the radio communication module, i.e. during the execution of the radio communication program by the module. In a particular embodiment, the radio communication program and the decompressing program are stored in the same non-volatile external memory.

3.2. Compressed Calibration Parameter Decompression Formula

Each calibration parameter is decompressed according to a compression formula defined by:

$$\text{Decompressed value} = \text{Offset} + (\text{Granularity} * \text{compressed value})$$

where

"Decompressed value" designates the decompressed value of the given parameter;

"Compressed value" designates the compressed value of the given parameter;

"Offset" corresponds to an offset value defined according to the typical value and the range of dispersion known in production; and "Granularity" corresponds to the size of the smallest interval between two values obtained after decompression (in other terms it corresponds to the step of discretization to be applied).

Figure 9:
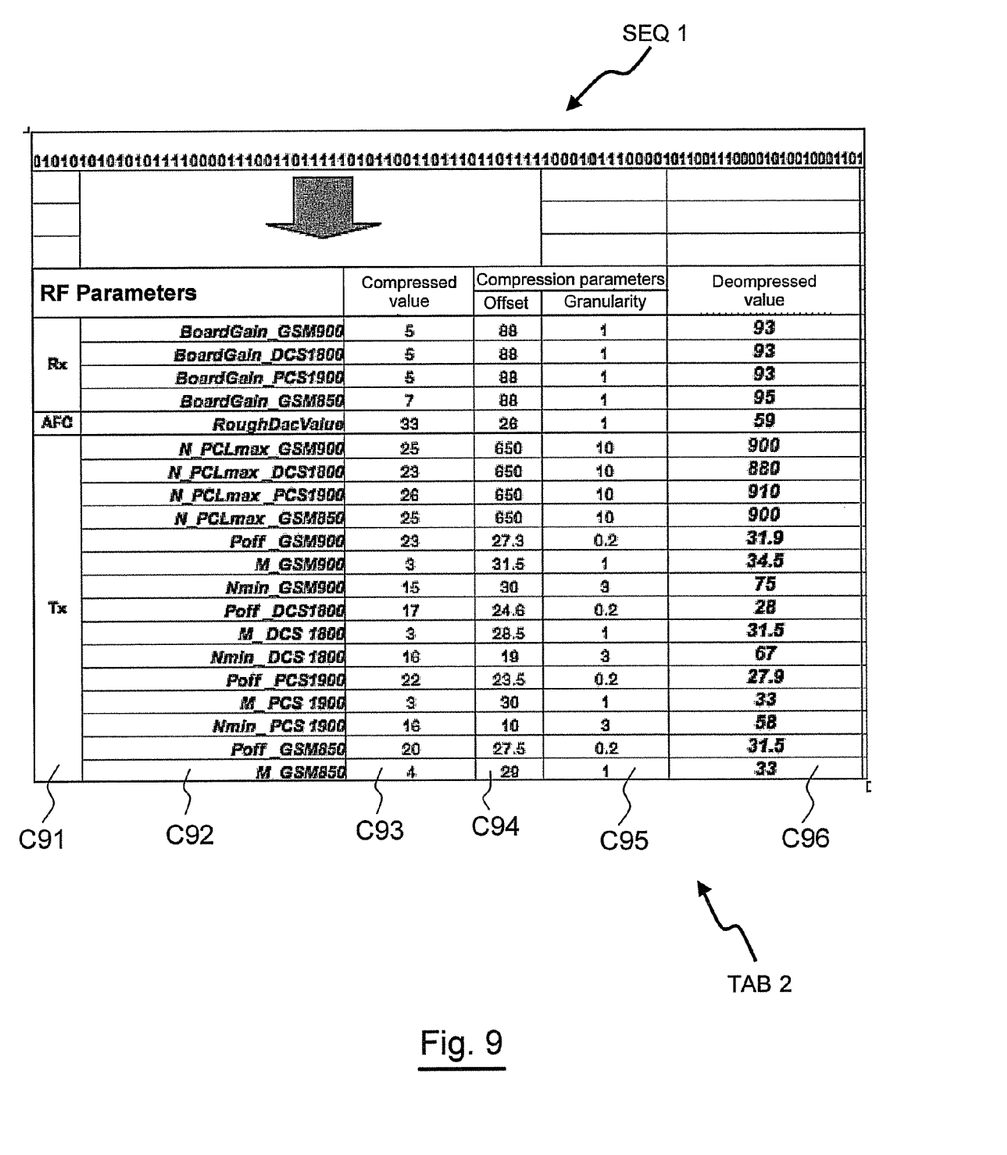
FIG. 9 shows a table showing decompressed calibration parameters, for the case of FIG. 8.

In relation with FIG. 9, an example of decompressing is now shown corresponding to the example of compressing in FIG. 8.

The 94-bit binary sequence SEQ1 is that obtained in the example of compressing described in FIG. 8.

The table TAB2 shows the minimal calibration parameters, for the particular case of a radio communication module of the GSM quad-band type. The first column C91 of the table indicates the type of parameter (Rx, AFC and Tx). The second column C92 indicates the name of the calibration parameters (for example "BoardGain_GSM900"). The third column C93 of the table indicates the compressed value of the calibration parameter. The fourth C94 and fifth C95 columns of the table indicate the compression parameters, i.e. the offset and the granularity. The sixth column C96 of the table indicates the decompressed value of the calibration parameter.

Figure 3:
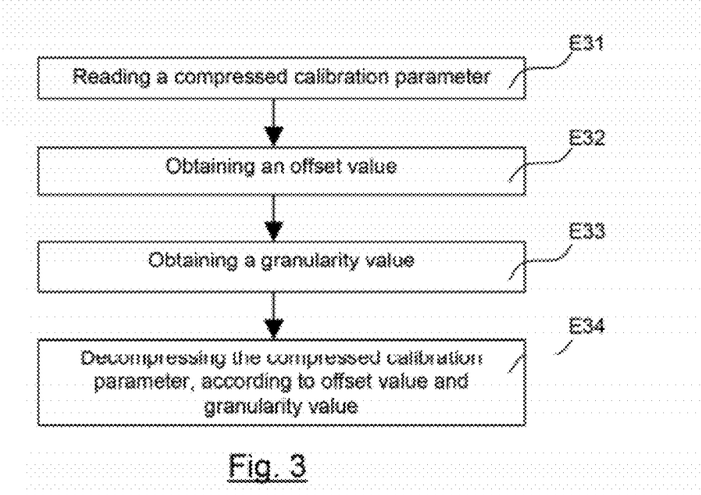
FIG. 3 shows a flow chart of a particular embodiment of a method of decompressing a calibration parameter.

In relation with FIG. 3, a flow chart is now shown showing a particular embodiment of the method of decompressing of compressed calibration parameters according to the invention.

During a first step E31, a compressed calibration parameter stored in an internal non-volatile memory is read in the radio communication module.

During a step E32, for the parameter read in step E31, an offset value is obtained that was defined during the compression of the parameter, according to a range of useful values, of a size that is less than the initial range, and of an average value of the parameter.

Then, during a step E33, for the parameter read in step E31, a granularity value is obtained, that was defined during the compression of the parameter, according to a maximum error value on the parameter.

Finally, during a step E34, the compressed value of the parameter read in step E31 is decompressed according to the compressed value, the offset value obtained in step E32 and the granularity value obtained in step E33.

4. Description of an Embodiment of the Radio Communication Module According to the Invention The example of the radio communication module 10 according to prior art, shown in FIG. 5, comprises:
- a board-to-board interface connector 1;
- a base band block 2, itself comprising a plurality of sub-blocks:
    Power: Power management,
    Audio: Audio interface management,
    PCM: "Pulse Code Modulation" output, audio output,
    UART1 and 2: Serial interface port,
    USB: Serial interface port,
    SIM 1.8V/3V: SIM 1.8 or 3V interface board,
    RTC: "Real Time Clock",
    RF Interface: Interface with the RF blocks,
    EXT_IT: External interruption,
    SPI1 and 2: Serial interface,
    12C: "12C" bus interface,
    GPIO: Input/output logical signals,
    ADC: Analogue input (ADC for Analogue to Digital Converter"),
    Keypad: Keyboard interface;
- an analogue block 3, itself comprising a plurality of sub-blocks:
    Audio Filter: Audio input/output signal filtering
    Charger: Battery charger
    Supply Interface: Power interface
- a radio block 4, itself comprising a plurality of sub-blocks:
    RF Transceiver: Radio-Frequency emission-receiving circuit
    RF Front End: Radio-Frequency switching and amplifying circuit.
- a terminal block 5, itself comprising an antenna connection, holding a coaxial cable to we soldered or a coaxial plug of the "UFL" type;
- a "combo" housing 6 combining a non-volatile memory (reprogrammable Flash memory in this example) and a volatile memory (PSRAM memory in this example), making it possible to store and execute a radio communication program (software).

Figure 5:
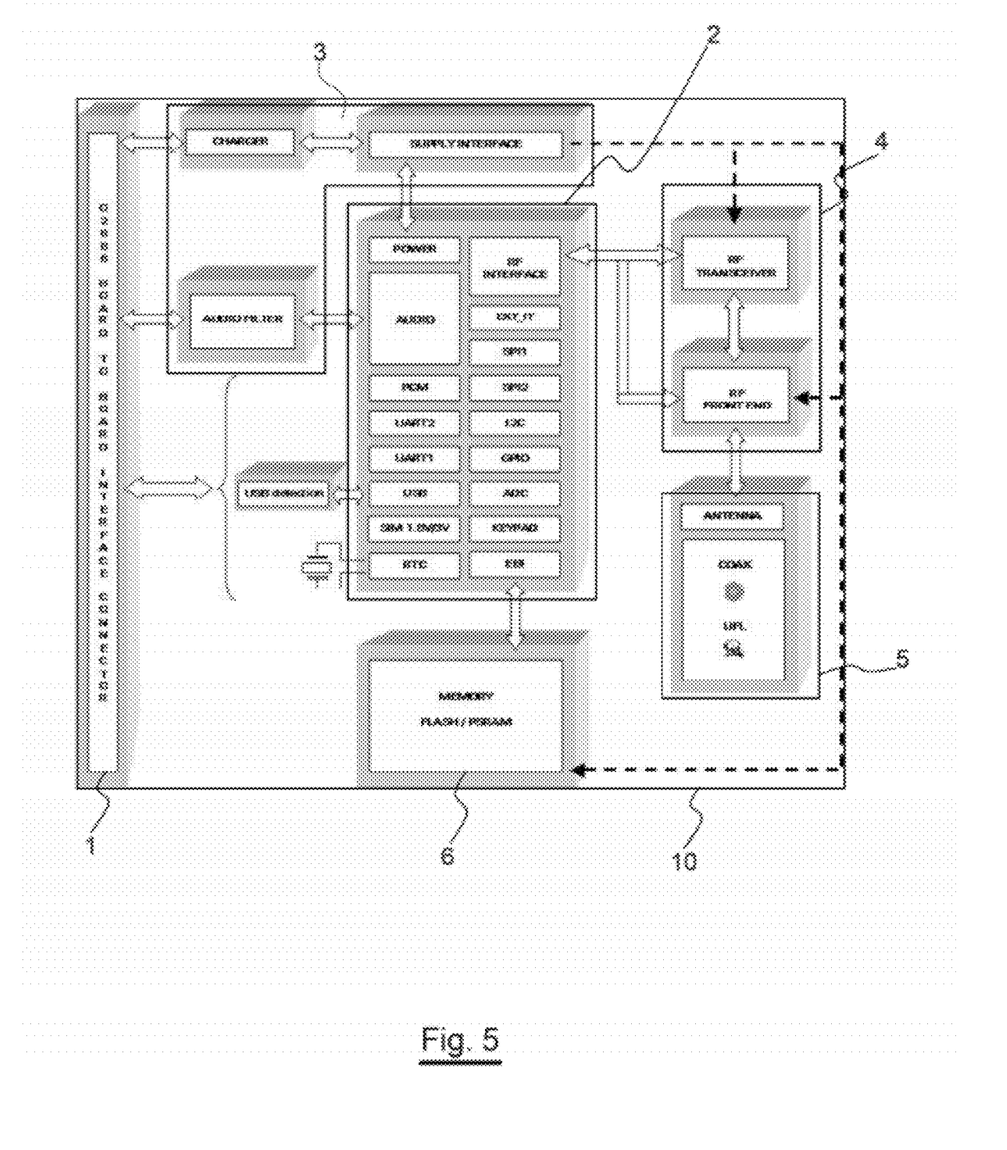
FIG. 5 shows a block diagram of an example of a radio communication module according to prior art.

Conventionally, and as already explained hereinabove, this module 10 is intended to be transferred onto a printed circuit of a radio communication device (portable telephone, modem, or any other device making use of a wireless standard).

Figure 6:
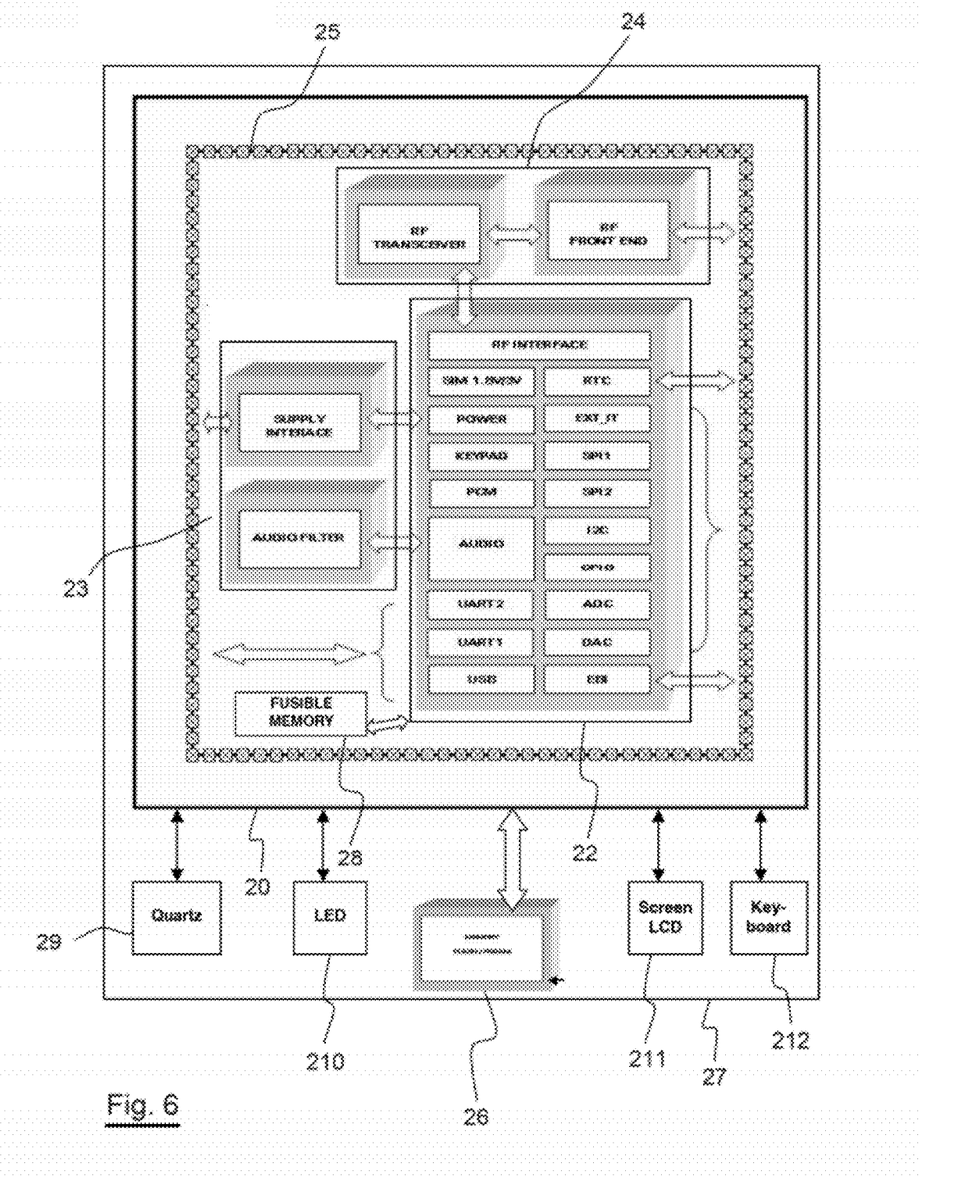
FIG. 6 shows a block diagram of a particular embodiment of a radio communication module according to the invention, and a radio communication device comprising such a module.

In relation with FIG. 6, a particular embodiment is now shown of a radio communication module according to the invention. This module 20 comprises:
- a base band block 22, substantially identical to that (referenced as 2) in FIG. 5 (it is distinguished from it simply in that it comprises an additional sub-block (DAC for Digital Analogue Converter));
- an analogue block 23, substantially identical to that (referenced as 3) in FIG. 5 (it is distinguished from it simply in that it does not comprise one of the sub-blocks (Charger));
- a radio block 24, identical to that (referenced as 24) in FIG. 5;
- a low-capacity non-volatile memory (non-reprogrammable OTP fusible memory in this example) 28. As explained in detail in what follows, this makes it possible to store the compressed calibration parameters;
- a set of connection balls 25, making a transfer possible on the surface of the module according to an embodiment of the invention (which has the form of a housing), on a printed circuit of radio communication device 27, using a conventional transfer technique, for example BGA or LGA. This allows for a large number of input/output interfaces (IOs), of which those allowing for a data/address memory connection (for example 16+23+6).

As also shown in FIG. 6, other components are transferred to the printed circuit of the radio communication device 27, i.e. in this example:
- one or several memories external to the module. In this example, a "combo" housing 26 combining a non-volatile memory (reprogrammable Flash memory in this example) and a volatile memory (PSRAM memory in this example) have been represented, making it possible to store and execute a radio communication program (software) and a decompressing program. It is clear that the manufacturer of the device can freely choose the memory housing(s) that it wants to place on the printed circuit of its device, which is one of the advantages of an embodiment of this invention;
- a quartz 29;
- a LED 210;
- an LCD screen 211; and
- a keyboard 212.

5. Radio Communication Module

Figure 7:
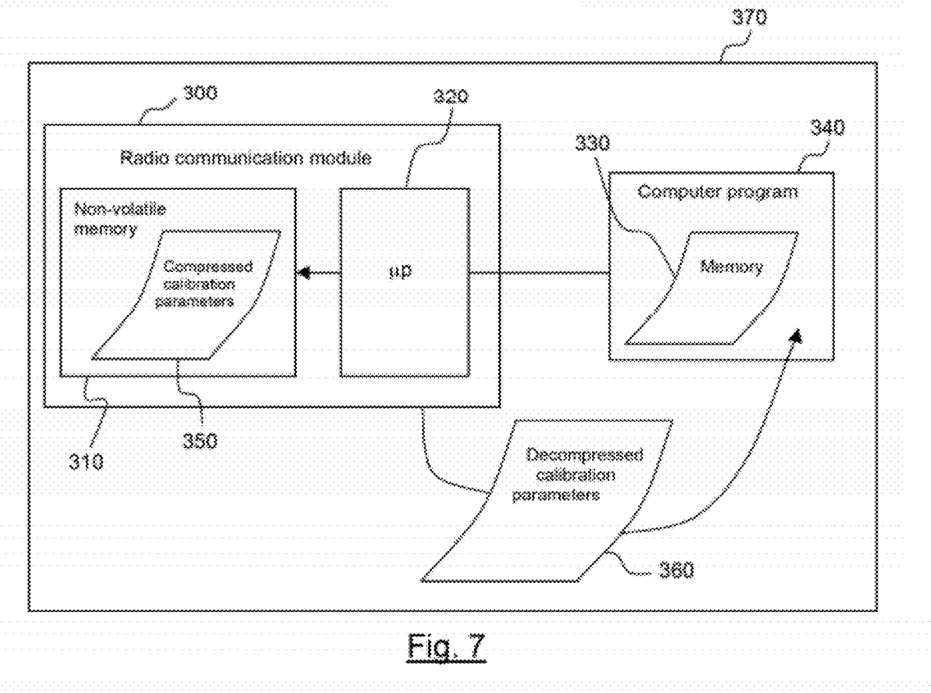
FIG. 7 shows the simplified structure of a particular embodiment of a radio communication module according to the invention.

FIG. 7 schematically shows the structure of a radio communication module 300 according to a particular embodiment of the invention, which comprises a low-capacity non-volatile memory 310, wherein are stored compressed calibration parameters 350, and a processing unit 320 provided with a µP microprocessor, which is driven by a computer program (or application) 330 that, when it is executed, implements the method of decompressing according to an embodiment of the invention. In the embodiment shown, the computer program 330 is stored in a memory 340 that is external to the module. During the initialization of the module, the processing unit 320 reads the compressed calibration parameters stored in the memory 310. The µP microprocessor processes these compressed calibration parameters, according to the instructions of the program 330, in order to obtain decompressed calibration parameters 360, which are then stored in the external memory 340. For the purposes of information, the radio communication module 300 according to an embodiment of the invention and the external memory 340 are built into a radio communication device 370.

In a particular embodiment, the computer program 330, when it is executed, also implements at least partially the following functional blocks (described in reference to FIG. 6):
  the base band block 22;
  the analogue block 23; and
  the radio block 24.

6. Appendix 1

RF Calibration Parameters that are Indispensable for the Proper Operation of a Radio Communication Module Introduction By way of example, hereinafter is presented a list of minimal calibration parameters (also referred to as essential calibration parameters) that are needed for the proper operation of the radio communication module and a calculation example of the minimal size of ROM (for "Read Only Memory") memory needed to store the aforementioned minimal calibration parameters.

Minimal calibration parameter refers to a parameter of which the effects of the dispersion in production have an impact on the quality of the radio communication module. In the example discussed, the minimal calibration parameters are compressed then stored in an internal non-volatile memory in the module, for example a ROM memory. Note that the minimal calibration parameters can be stored in any type of OTP (for "One Time Programmable") memory.

It is important to note that all of the other parameters stored in the non-volatile memory of the communication module can be "hard coded" in the radio communication program (i.e. the functional software).

The calculation of the minimal size of ROM memory needed, shown hereinafter, is based on the results of the "run Q2686-PR2", i.e. 400 modules, with components all stemming from the same batch. This is therefore representative only of a dispersion within a batch, not a batch-to-batch dispersion. Note that a "run" means "series" in a familiar language. The "Run Q2686-PR2" means the production of a series of Prototype (here, the second, since "PR2" means "Prototype Run n02") of the "Q2686" product.

Analysis of the Essential Calibration Parameters

| Parameter | Current size in E2P | Description | Typical value | Range observed on Q2686-PR2 | Minimal size |
|---|---|---|---|---|---|
| BoardGain_GSM900 | u8 | Receiving channel gain, parameter needed to comply with the standard in terms of RSSI measurement. | 95 | 92-98 | u4 (16) |
| BoardGain_DCS1800 | u8 | | 95 | 92-97 | u4 |
| BoardGain_PCS1900 | u8 | | 95 | 91-97 | u4 |
| BoardGain_GSM850 | u8 | | 95 | 91-99 | u4 |
| RoughDacValue | u16 | Rough calibration value of the AFC | 55 | 40-75 | u6 (64) |
| AfcStepValue | u16 | Slope: No. of Hz per AFC step | 5 | Identical env. for a given quartz | — |
| N_PLCmax_GSM900 | u16 | Values of DAC to output power at PLCmax - indispensable for RF@Pmax perfs. | | 711-920 | u8 (256) |
| N_PLCmax_DCS1800 | u16 | | | 716-888 | u8 |
| N_PLCmax_PCS1900 | u16 | | | 701-910 | u8 |
| N_PLCmax_GSM850 | u16 | | | 717-901 | u8 |
| Modelling parameters of the RF Amplifier (calculated by the calibration bench) | | | | | |
| Poff_GSM900 | | Parameters of the equation characterising the PA in GSM900 | 31.6 | 28.50-32.3 | u6 (64) |
| M_GSM900 | | | 35 | 33.4-36.5 | u6 |
| Nmin_GSM900 | | | 80 | 60-95 | u6 |
| Poff_DCS1800 | | Parameters of the equation characterising the PA in GSM1800 | 27.7 | 26-29.3 | u6 (64) |
| M_DCS 1800 | | | 31.5 | 30.4-33.9 | u6 |
| Nmin_DCS 1800 | | | 70 | 40-90 | u6 |
| Poff_PCS1900 | | Parameters of the equation characterising the PA in GSM1900 | 28 | 24.7-28.8 | u6 (64) |
| M_PCS 1900 | | | 33.8 | 31.4-35.8 | u6 |
| Nmin_PCS 1900 | | | 65 | 27-84 | u6 |

-continued

| Parameter | Current size in E2P | Description | Typical value | Range observed on Q2686-PR2 | Minimal size |
|---|---|---|---|---|---|
| Poff_GSM850 | | Parameters of the equation characterising the PA in GSM850 | 31.8 | 28.9-32.3 | u6 (64) |
| M_GSM850 | | | 33 | 31.4-34.2 | u6 |
| Nmin_GSM850 | | | 85 | 72-108 | u6 |

The minimal sizes expressed above as u4, u6 or u8 result in for u4=4 bits, u6=6 bits and u8=8 bits. "u" simply stands for "unsigned" i.e. the number is unsigned binary-coded (positive integer). This is a minimum of bit needed to code the information that is essential for the calibration of the 126-bit module (4×u4+u6+4×u8+12×u6=4×4+6+4×8+12×6=126)

Axes of Optimization a) Reduction in the coding resolution of certain parameters characterizing the amplifier. More feedback on the batch-to-batch dispersion seems however desirable before attempting an excessive discretization of these parameters.

b) The parameter characterizing the "Poff" amplifier seems to be rather similar for the two low bands and the two high bands. A study carried out on 200 modules shows that the difference between the Poffs is from −0.6 to +0.3 dB on the low bands, and from −0.5 to +1.1 dB on the high bands.

c) Similarities also between the M parameters on the two low bands and the two high bands. On 200 modules the difference between the Ms is from −1.4 to +1.4 on the low bands, and from −2.3 to +0.5 on the high bands.

d) Idem for the parameter Nmin, with, on 200 modules a difference between the Nmin between −22 and 4 on the low bands, and from 4 to 13 on the high bands.

e) For the N_PCLmax parameter, on 200 modules the difference of −15 and +25 on the low bands, and −23 to +56 on the high bands. The operation seems to be less profitable.

f) In conclusion, it is observed that one could, for the low bands as well as for the high bands, code only the parameters corresponding to the Europe bands, and only code one offset in relation to the latter, for the US bands. This is also valid for the N_PCLmax. This is a way to make use of the existing correlation between the two low bands and the two high bands. The following table would then be obtained:

| Tx | N_PLCmax_GSM900 | Values of DAC to output power at PLCmax | u8 (256) |
|---|---|---|---|
| | N_PLCmax_DCS1800 | | u8 |
| | N_PLCmax_PCS1900 | Delta/DCS | s7 (+/−62) |
| | N_PLCmax_GSM850 | Delta/GSM900 | s7 (+/−62) |
| | Poff_GSM900 | Parameters of the equation characterising the PA in GSM900 | u6 (64) |
| | M_GSM900 | | u6 |
| | Nmin_GSM900 | | u6 |
| | Poff_DCS1800 | Parameters of the equation characterising the PA in GSM1800 | u6 (64) |
| | M_DCS 1800 | | u6 |
| | Nmin_DCS 1800 | | u6 |
| | Poff_PCS1900 | PCS Delta parameters in relation to DCS | s5 (+/−16) |
| | M_PCS 1900 | | s6 (+/−32) |
| | Nmin_PCS 1900 | | s5 (+/−16) |
| | Poff_GSM850 | Delta parameters GSM850 in relation to GSM900 | s5 (+/−16) |
| | M_GSM850 | | s6 (+/−32) |
| | Nmin_GSM850 | | s5 (+/−16) |

The savings in the number of bits used is not so obvious. Indeed, only 6 bits would be saved.

This comes from the fact that the initial study already takes into account the fact that the range of "useful" values (coming from the ranges observed in production) is reduced, and that the size of the variable has already been reduced consequently.

Resolution Needed

It appears interesting, at this stage in thought, to analyse the influence of the precision of the various parameters that characterize the power amplifier (noted in what follows) on the final calibration error.

It is considered, at the base, that the residual error of the initial calibration (error made when the determination of the parameters by iterative calculation) is ±0.4 dB.

Any error tied to a reduction in the resolution of the parameters will be added to this initial error.

If the equation characterizing the RF power amplifier RF is considered:

$$P = M \log(k) + Poff + M \log(N - Nmin)$$

where k is the constant that characterizes the digital/analogue convertor (noted in what follows as DAC), with in this case, $\log(k) = -2.78$;

P: RF power output of the product expressed in dBm;

M: Parameter characterizing the RF power amplifier (similar to a "slope");

Poff: Parameter characterizing the RF power amplifier (similar to an offset);

N: Numerical value applied to the digital-analogue convertor generating the desired voltage applied to the amplifier;

Nmin: Parameter characterizing the RF power amplifier.

The incidence of the resolution of the three parameters M, Nmin and Poff can be estimated by deriving the function partially on these parameters and by increasing the derivative using the extreme values of the parameters, observed on the PR2 (400 modules only). This here entails estimating what are the most sensitive parameters rather than putting a precise figure on the incidence on the precision (insufficient number of boards produced).

With:

$$\frac{\partial P}{\partial M} = \log(k) + \log(N - Nmin) < \log(k) + \log(N_{MAX} - Nmin_{MIN}) < 0.2$$

That is to say, practically, that a variation of 1 on the parameter M will have as an incidence a maximal error of 0.2 dB on the calibration (value calculated using the range observed in production, on 400 modules).

More concretely, than in the case where it would be chosen have a parameter M in common for the two low or high bands, the error generated would be of a magnitude of 0.6 dB.

$$\frac{\partial P}{\partial Nmin} = \frac{-M}{(N - Nmin) \times 1(10)} < \frac{-M_{MAX}}{(N_{MIN} - Nmin_{MAX}) \times \ln(10)} \cong 0.12$$

In the same way, a variation of 1 on the Nmin parameter will have as an incidence a maximum error of 0.12 dB on the calibration (value calculated using the range observed in production, on 400 modules).

In the case where it would be chosen to have a parameter Nmin in common for the two low or high bands, the error generated would be of a magnitude of 3 dB.

$$\frac{\partial P}{\partial Poff} = 1$$

A variation of 0.1 dB on the Poff parameter having the same incidence on the calibration error, it would be advantageous to maintain its current resolution for this parameter, i.e. 0.1 dB.

This here entails the most sensitive parameter, and having this parameter in common for the two low or high bands, taking the study carried out above into account, would result in an error of 1.6 dB.

Practical Application

Here is a concrete example of reducing the coding resolution of the various parameters, based on the previous study:

BoardGain: A lesser resolution cannot be considered, since the margin on this parameter is already low (margins of 1 dB). The standard allows for +/−3 dB. Switching to a resolution of 2 dB would generate non-compliant products;

RoughDACValue: The current resolution is already of a magnitude of 1 ppm. A lesser resolution (2 ppm for example), would concretely means 1 ppm less on the authorized aging, and the latter is already highly limited (approx. 1 ppm/year);

N_PCLmax: The current resolution seems superfluous. If the sensitivity on this parameter is examined, the following formula is obtained:

$$\frac{\partial P}{\partial N} = \frac{M}{(N - N\min) \times \ln(10)} < \frac{M_{MAX}}{(N_{MIN} - N\min_{MAX}) \times \ln(10)}$$

and by taking MMAX<36.5; NMIN>700 and NminMAX<110, a max. sensitivity of 0.027 dB/DAC step is obtained;

The purpose of this parameter is a fine calibration of the max PCL, the most sensitive PCL, from a customer standpoint as well as from a VCF standpoint. The determination of this value is carried out very precisely by the test bench.

If an imprecision on this power of 0.2 dB is tolerated (not enough to saturate the PA), it can be concluded from this that the resolution could be reduced to 8 DAC steps. This is 3 bits saved, and a size for the variable that changes from u8 to u5 (32 steps). Thus, for example, 32 values stepped from 700 to 948.

Total savings would therefore be 12 bits.

Nmin: It has been seen that the sensitivity on this parameter was at worst 0.12 dB/steps.

This means that it can be considered, for example, switching to a resolution of 2 steps, which would generate an error of 0.24 dB;

The 4 u6 variables would become u5 variables (32 steps) which is a total savings of 4 bits.

M: The sensitivity on this parameter is 0.02 dB/step (current resolution of 0.1). A resolution that is not as fine can therefore be considered, for example 0.8. The 4 u6 variables would become u3 variables (8 steps). So for example from 30 to 36.4 in steps of 0.8;

The total savings generated would then be 12 bits for an error of 0.16 dB.

Poff: It has been seen that the sensitivity on this parameter was maximal. We could therefore limit this to reducing the resolution from 0.1 dB to 0.2 dB. This is a switch of the variable from u6 to u5 (32 steps).

Here is a summary of the proposal:

| | | |
|---|---|---|
| Rx | BoardGain__GSM900 | u4 (16) |
| | BoardGain__DCS1800 | u4 |
| | BoardGain__PCS1900 | u4 |
| | BoardGain__GSM850 | u4 |
| AFC | RoughDacValue | u6 (64) |
| | AfcStopValue | — |
| Tx | N__PLCmax__GSM900 | u5 (32) |
| | N__PLCmax__DCS1800 | u5 |
| | N__PLCmax__PCS1900 | u5 |
| | N__PLCmax__GSM850 | u5 |
| | Poff__GSM900 | u5 (32) |
| | M__GSM900 | u3 (8) |
| | Nmin__GSM900 | u5 (32) |
| | Poff__DCS1800 | u5 (32) |
| | M__DCS 1800 | u3 (8) |
| | Nmin__DCS 1800 | u5 (32) |
| | Poff__PCS1900 | u5 (32) |
| | M__PCS 1900 | u3 (8) |
| | Nmin__PCS 1900 | u5 (32) |
| | Poff__GSM850 | u5 (32) |
| | M__GSM850 | u3 (8) |
| | Nmin__GSM850 | u5 (32) |

The sum of the errors generated by this proposal is 0.6 dB, which, added to an initial error of calibration algo of ±0.4 dB, gives a cumulative error of ±1 dB.

The number of bits needed to store this calibration would then be 94.

7. Conclusion

At least one embodiment of the invention provides a technique making it possible to initialize a radio communication without having to use costly calibration parameters, in particular in terms of memory.

At least one embodiment provides a calibration parameter compression technique that is simple to implement and that is effective, especially in terms of reducing the size of the storage space to be used.

An embodiment of the invention also proposes such a compression technique that is in particular well suited to the use of a non-volatile memory of reduced size (of a magnitude of a few hundred bits), for example of the fusible type (originally intended to receive a serial number).

An embodiment of the invention provides a decompressing technique that is simple to implement and that is effective, especially in terms of rapidity in restoring calibration parameters.

At least one embodiment provides a technique making it possible for the supplier of the radio communication module to continue to ensure its customer that the module is certified, calibrated and that the intellectual property rights (IPRs) are included.

Although the present disclosure has been described with reference to one or more examples, workers skilled in the art will recognize that changes may be made in form and detail without departing from the scope of the disclosure and/or the appended claims.

The invention claimed is:

1. A method of initializing an electronic radio communication module capable of executing at least one radio communication program, stored in a first non-volatile memory, said initialization being based on calibration parameter values, wherein said method comprises the following steps, carried out by said electronic radio communication module when said electronic radio communication module executes said at least one radio communication program:

reading at least one compressed calibration parameter in a second non-volatile memory;

decompressing each compressed calibration parameter read, in order to obtain a decompressed calibration parameter, wherein a value of each compressed calibration parameter is comprised in an initial range of possible values, said initial range being centered on an average value and function of a dispersion of said electronic radio communication module, wherein decompressing comprises the following steps, for at least one compressed calibration parameter:

obtaining an offset value defined beforehand, during compression of said at least one compressed calibration parameter, according to a range of useful values, of a size that is less than said initial range, and of an average value of said at least one compressed calibration parameter;

obtaining a granularity value, defined beforehand during the compression of said at least one compressed calibration parameter, according to a maximum error value on said at least one compressed calibration parameter; and decompressing said at least one compressed calibration parameter according to compressed calibration parameter, said offset value and said granularity value, so as to obtain the decompressed calibration parameter; and initializing said electronic radio communication module based on a value of said decompressed calibration parameter.

2. The method of initializing according to claim 1, wherein said first non-volatile memory is external to said electronic radio communication module.

3. The method of initializing according to claim 1, wherein said electronic radio communication module executes a step of storing said decompressed calibration parameters in a third volatile memory.

4. The method of initializing according to claim 3, wherein said third volatile memory is external to said electronic radio communication module.

5. The method of initializing according to claim 1, wherein said electronic radio communication module executes said step of reading, by reading said compressed calibration parameters in a non-volatile memory internal to said electronic radio communication module and forming said second non-volatile memory.

6. The method of initializing according to claim 1, wherein said at least one compressed calibration parameter comprises at least one parameter relating to a power amplifier included in said electronic radio communication module, wherein the at least one parameter that relates to a power amplifier comprises at least one of a reception parameter, a transmission parameter or a frequency parameter.

7. A method of compressing at least one calibration parameter of an electronic radio communication module capable of executing at least one radio communication program stored in a first non-volatile memory, said electronic radio communication module being initialized with a value of each calibration parameter, said value of each calibration parameter being included in an initial range of possible values, said initial range being centered on an average value and function of the dispersion of said electronic radio communication module, wherein said method comprises the following steps, for at least one calibration parameter:

obtaining, for said at least one calibration parameter, a range of useful values, of a size that is less than said initial range, the range of useful values being defined by limits that are chosen in such a way as to include values of said at least one calibration parameter that are actually possible to encounter in production;

obtaining, for said at least one calibration parameter, a maximum error value on said at least one calibration parameter so as to maintain an operation of said electronic radio communication module that complies with predetermined specifications;

obtaining a discrete value of said at least one calibration parameter within said range of useful values;

compressing said discrete value according to said discrete value, said range of useful values of said at least one calibration parameter and said maximum error value so as to obtain a compressed value.

8. The method of compressing according to claim 7, wherein the method comprises a prior step of selecting at least one calibration parameter, according to at least one dispersion criterion.

9. The method of compressing according to claim 7, wherein said step of compressing implements a compression such that, for a given calibration parameter, the compressed value of said given calibration parameter is defined by:

$$\text{Compressed value} = E((\text{Initial value} - \text{Offset})/\text{Granularity})$$

where

"Compressed value" designates the compressed value of said given calibration parameter;

"Initial value" designates the discrete value of said given calibration parameter;

"Offset" corresponds to an offset value defined according to a typical value and range of dispersion known in production;

"Granularity" corresponds to the size of the smallest interval between two values obtained after decompression; and "E" designates the notation of the integer function.

10. A method of decompressing at least one calibration parameter of an electronic radio communication module capable of executing at least one radio communication program stored in a first non-volatile memory, said electronic radio communication module being initialized with a value of each calibration parameter, said value of each calibration parameter being comprised in an initial range of possible values, said initial range being centered on an average value and function of the dispersion of said electronic radio communication module, wherein said method comprises the following steps, for at least one compressed calibration parameter:

obtaining an offset value defined beforehand, during the compression of said at least one compressed calibration parameter, according to a range of useful values, of a size that is less than said initial range, and of an average value of said at least one compressed calibration parameter;

obtaining a granularity value, defined beforehand during the compression of said at least one compressed calibration parameter, according to a maximum error value on said at least one compressed calibration parameter;

decompressing said at least one compressed calibration parameter according to said at least one compressed calibration parameter, said offset value and said granularity value, so as to obtain a decompressed value.

11. The method of decompressing according to claim 10, wherein said step of decompressing implements a decompression such that, for a given calibration parameter, the decompressed value of said given calibration parameter is defined by:

Decompressed value=Offset+
(Granularity*compressed value)

where
- "Decompressed value" designates the decompressed value of said given calibration parameter;
- "Compressed value" designates the compressed value of said given calibration parameter;
- "Offset" corresponds to an offset value defined according to a typical value and range of dispersion known in production; and
- "Granularity" corresponds to the size of the smallest interval between two values obtained after decompression.

12. A storage medium readable by a computer, storing a set of instructions that can be executed by an electronic radio communication module, said set of instructions performing a method of initializing said electronic radio communication module and being stored in a first non-volatile memory, method of initializing being based on calibration parameter values, wherein said method of initializing comprises the following steps, carried out by said electronic radio communication module when said electronic radio communication module executes said set of instructions:

reading at least one compressed calibration parameter in a second non-volatile memory;

decompressing each compressed calibration parameter read, in order to obtain a decompressed calibration parameter, wherein a value of each compressed calibration parameter is comprised in an initial range of possible values, said initial range being centered on an average value and function of a dispersion of said electronic radio communication module, wherein decompressing comprises the following steps, for at least one compressed calibration parameter:

- obtaining an offset value defined beforehand, during compression of said at least one compressed calibration parameter, according to a range of useful values, of a size that is less than said initial range, and of an average value of said at least one compressed calibration parameter;
- obtaining a granularity value, defined beforehand during the compression of said at least one compressed calibration parameter, according to a maximum error value on said at least one compressed calibration parameter; and
- decompressing said at least one compressed calibration parameter according to compressed calibration parameter, said offset value and said granularity value, so as to obtain the decompressed calibration parameter; and initializing said electronic radio communication module based on a value of said decompressed calibration parameter.

* * * * *